(12) United States Patent
Jones et al.

(10) Patent No.: US 11,354,635 B2
(45) Date of Patent: Jun. 7, 2022

(54) PAYMENT MESSAGE INTERFACE

(71) Applicant: NCR Corporation, Duluth, GA (US)

(72) Inventors: Michael L. Jones, Cumming, GA (US); Carl L. Best, Buford, GA (US)

(73) Assignee: NCR Corporation, Atlanta, GA (US)

( * ) Notice: Subject to any disclaimer, the term of this patent is extended or adjusted under 35 U.S.C. 154(b) by 644 days.

(21) Appl. No.: 15/719,123

(22) Filed: Sep. 28, 2017

(65) Prior Publication Data

US 2019/0095892 A1 Mar. 28, 2019

(51) Int. Cl.
| | |
|---|---|
| *G06Q 30/00* | (2012.01) |
| *G06Q 20/16* | (2012.01) |
| *G06Q 30/02* | (2012.01) |
| *G06Q 20/40* | (2012.01) |
| *G06F 16/25* | (2019.01) |
| *G06Q 20/32* | (2012.01) |
| *H04L 69/08* | (2022.01) |
| *H04L 49/90* | (2022.01) |
| *H04W 4/80* | (2018.01) |
| *G06Q 20/20* | (2012.01) |

(52) U.S. Cl.
CPC .......... *G06Q 20/16* (2013.01); *G06F 16/258* (2019.01); *G06Q 20/3255* (2013.01); *G06Q 20/40* (2013.01); *G06Q 30/0233* (2013.01); *H04L 69/08* (2013.01); *G06Q 20/204* (2013.01); *G06Q 20/4012* (2013.01); *G06Q 2220/00* (2013.01); *H04L 49/90* (2013.01); *H04W 4/80* (2018.02)

(58) Field of Classification Search
CPC .... G06Q 20/16; G06Q 20/3255; G06Q 20/40; G06Q 30/0233; G06Q 20/204; G06Q 20/4012; G06Q 2220/00; G06F 16/258; H04L 69/08; H04L 49/90; H04W 4/80
USPC .............................................. 705/14.1–14.73
See application file for complete search history.

(56) References Cited

U.S. PATENT DOCUMENTS

| | | | | |
|---|---|---|---|---|
| 2002/0065716 | A1* | 5/2002 | Kuschill | G06Q 30/02 705/14.27 |
| 2003/0141360 | A1* | 7/2003 | De Leo | G06Q 30/02 235/379 |
| 2005/0190915 | A1* | 9/2005 | Pare | H04L 65/602 380/201 |
| 2006/0269148 | A1* | 11/2006 | Farber | G06Q 40/00 382/232 |

(Continued)

OTHER PUBLICATIONS

Raina, V. K., Pandey, U. S., Makkad, M.Use of mobile transactions payment model in customer oriented payment system using NFC technology (2012) International Journal of Mathematical and Computer Sciences.*

(Continued)

*Primary Examiner* — Ilana L Spar
*Assistant Examiner* — Allan J Woodworth, II
(74) *Attorney, Agent, or Firm* — Schwegman, Lundberg & Woessner

(57) ABSTRACT

Systems and methods for providing a payment messaging interface may include receiving, at a computing device comprising a processor, transaction information regarding the transaction. Once the transaction information is received, the transaction information may be translated into a data structure that corresponds to a payment processor. Once the transaction information has been translated, the data structure may be transmitted to the payment processor.

14 Claims, 3 Drawing Sheets

(56) References Cited

U.S. PATENT DOCUMENTS

| | | | | |
|---|---|---|---|---|
| 2010/0110004 A1* | 5/2010 | Minutillo | ............ | H04M 1/2473 345/157 |
| 2011/0155800 A1* | 6/2011 | Mastrangelo | ........ | G06Q 20/352 235/379 |
| 2012/0221468 A1* | 8/2012 | Kumnick | ............... | G06Q 20/20 705/44 |
| 2014/0207592 A1* | 7/2014 | Kavis | ..................... | G06Q 40/12 705/21 |
| 2014/0279561 A1* | 9/2014 | Carapelli | ............ | G07F 19/2055 705/71 |
| 2016/0019536 A1* | 1/2016 | Ortiz | .................. | G06Q 20/3227 705/67 |
| 2016/0140541 A1* | 5/2016 | Pearson | ................. | G06Q 20/02 705/14.27 |
| 2018/0295177 A1* | 10/2018 | Leach | ..................... | H04L 67/06 |
| 2019/0354960 A1* | 11/2019 | Tabak | ................. | G06Q 30/0226 |

OTHER PUBLICATIONS

Bi-Endian Compiler: A Robust and High Performance Approach for Migrating Byte Order Sensitive Applications , E Brevnov, M Domeika, M LoenKo, P Ozhdikhin, Intel Technology Journal, 2012.*

* cited by examiner

PAYMENT MESSAGE INTERFACE

SUMMARY

Systems and methods for providing a payment messaging interface may include receiving, at a computing device comprising a processor, transaction information regarding the transaction. Once the transaction information is received, the transaction information may be translated into a data structure that corresponds to a payment processor. Once the transaction information has been translated, the data structure may be transmitted to the payment processor.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
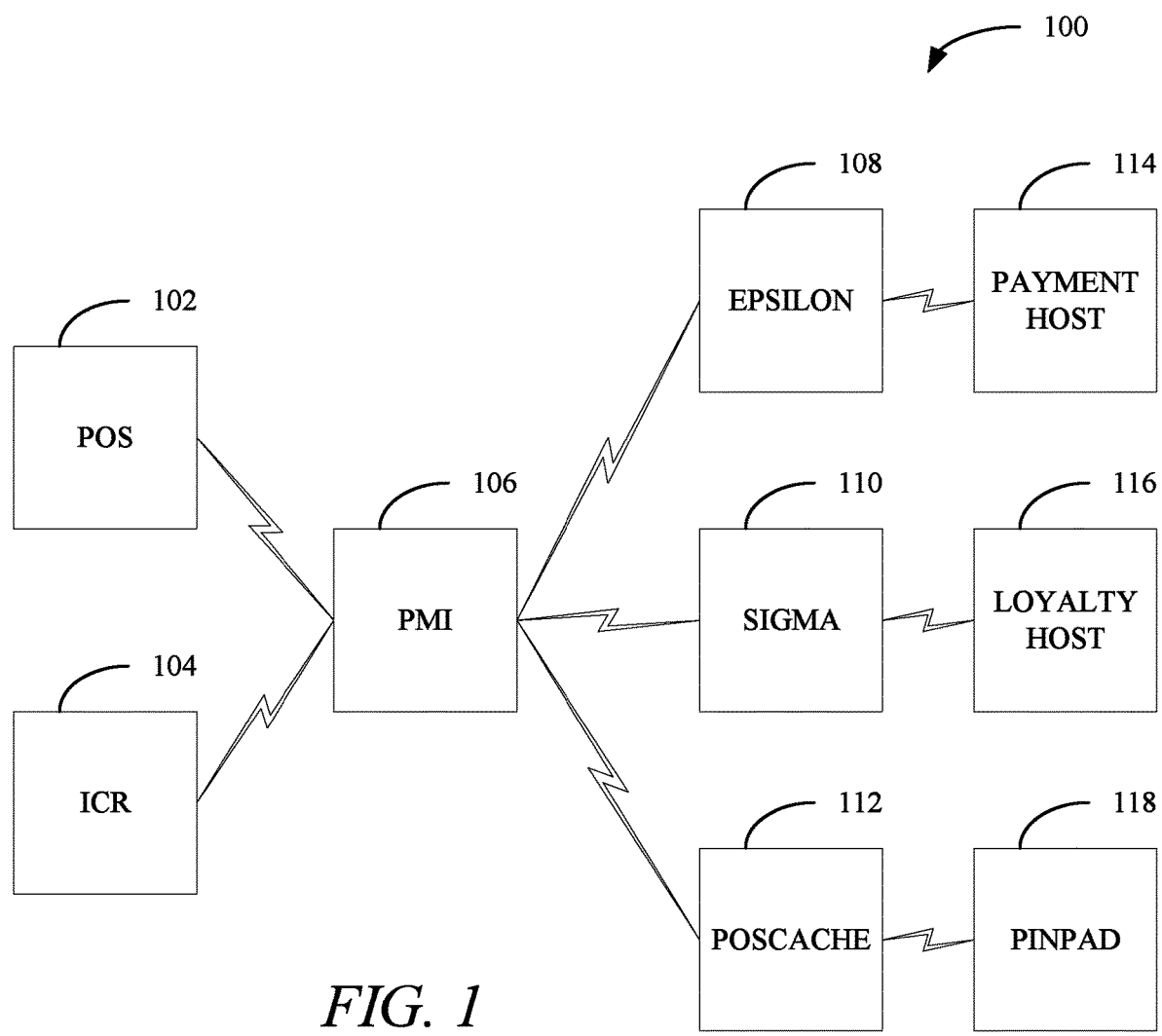
FIG. 1 shows an operating environment for a payment message interface consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Currently, developers for point of sale (POS) and card readers (ICR) devices have to write to multiple interfaces. For example, the POS/ICR developers may have to right to a credit/debit interfaces, sometimes referred to as Epsilon, loyalty programs, sometimes referred to as Sigma, and pinpad controllers, sometimes referred to as POSCache. In the past, a POS device would communicate with the three interfaces via three individual ports.

As disclosed herein, a payment message interface may allow for a simplified POS solution that may allow a single connection to the various services. To accomplish this simplification, disclosed herein may be systems and methods that allow for an XML based, or other high level language, service that may utilize Java's JAXB to accept messages from multiple POS devices. The payment message interface (PMI) systems and methods disclosed herein may provide an interface into all current electronic payment systems (EPS). The systems and methods disclosed herein may provide access to all EPS functionality using a single connection by the POS instead of separate connections for each EPS. The single connection may allow for the transaction requests made in an XML message format to be translated into requests using the native interface, sometimes referred to as a NVP interface.

The systems and methods disclosed herein may allow for the removal of the binary dependencies between POS systems and the payment engine. In addition, the systems and methods disclosed herein may provide a high level interface using XML instead of the lower level NVP interface which can be challenging to code to. Furthermore, the systems and methods disclosed herein may allow for the implementation of a protocol level interface (e.g., XML over a socket) instead of a code level interface (e.g., RSCommon lib with NVP Interface) allowing for easier modifications of the Epsilon, Sigma, and POSCache codebase independently of the POS device that will access the services.

FIG. 1 shows an operating environment 100 for a payment message interface consistent with this disclosure. The operating environment 100 may include a POS device 102, a ICR 104, a PMI system 106, an epsilon system 108, a sigma system 110, and a POSCache system 112. As shown in FIG. 1, the PMI system 106 may link the POS device 102 and the ICR 104 to the epsilon system 108, the sigma system 110, and the POSCache system 112. The connection between the PMI system 106 may form a part of a network such as, but not limited to, a wide area network, a local area network, the Internet, etc. The connections may be wired or wireless.

The epsilon system 108 may be connected to a payment host 114, the sigma system 110 may be connected to a loyalty host 116, and the POSCache system 112 may be connected to a pinpad 118. While FIG. 1 shows a single payment host, a single loyalty host, and a single pinpad, the epsilon system 108, the sigma system 110 and the POSCache system 112 may connect to multiple payment hosts, loyalty hosts, and pinpads. For example, the epsilon system 108 may connect to different payment hosts that process different types of payments such as credit/debit cards, checks, gift cards, etc. The sigma system 110 may connect to different loyalty hosts operated by different vendors. For instance, a first loyalty host may be operated by a credit card company and a second loyalty host may be operated by a merchant. In addition, the loyalty host 116 and a payment host 114 may be operated by the same entity. For example, the loyalty host 116 may be operated by a credit card company that provides reward points or cash back based on an amount spent. As a result, the payment host 114 may be operated by the credit card company that also operates the loyalty host 116.

As shown in FIG. 1, without the PMI system 106, the POS device 102 and the ICR 104 would have to communicate with the epsilon system 108, the sigma system 110, and the POSCache system 112. Using the PMI system 106, during a transaction a single message can be sent by the POS device 102 or the ICR 104 to the PMI system 106 instead of three messages to the other systems. The reduced network traffic increases efficiency by reducing bandwidth usage and decreasing latency within the network.

As further shown in FIG. 1, the PMI system 106 can communicate with both payment and loyalty systems and a single transaction can be routed or transmitted to multiple locations based on content of the message. For example, it is possible to have five or more different payment processors and three or more different loyalty processors. For instance, there may be separate payment processors bank cards, gift cards, EBT cards, fleet cards, and mobile devices (e.g., smart phones and smart watches). In tradition systems, the loyalty processors would typically be routed on bin, but using the PMI system 106 may be sent to multiple processors at the same time. Stated another way, the PMI system 106 does not preclude a single processor from providing payment and loyalty through a single connection.

As disclosed herein, the PMI system 106 may allow the POS device 104 to interact with the pinpad 118 if needed. For example, at the beginning of a transaction, the PMI system 106 may activate the pinpad 118 with a "StartTran" command. Similarly, at the end of a transaction, the PMI system 106 may deactivate the pinpad 118 with a "EndTran" command. By activating the pinpad 118 at the beginning of the transaction, the POS device 102 may use the pinpad 118 as an order confirmation screen by sending an "AddDisplay" to the pinpad 118. The epsilon system 108 may drive the pinpad 118 when the POS device 102 sends in a sale operation. Also, if the POS device 102 needs to ask the customer for information or confirmation, the POS device 102 may an operation like RequestPIN or ConfirmAddress to the pinpad 118 that will be displayed and return the PIN or confirmation. If the POS device 102 needs a signature, such as at a pharmacy to receive a prescription, then PMI system 106 could provide a UTF-8 format of the signature.

Figure 2:
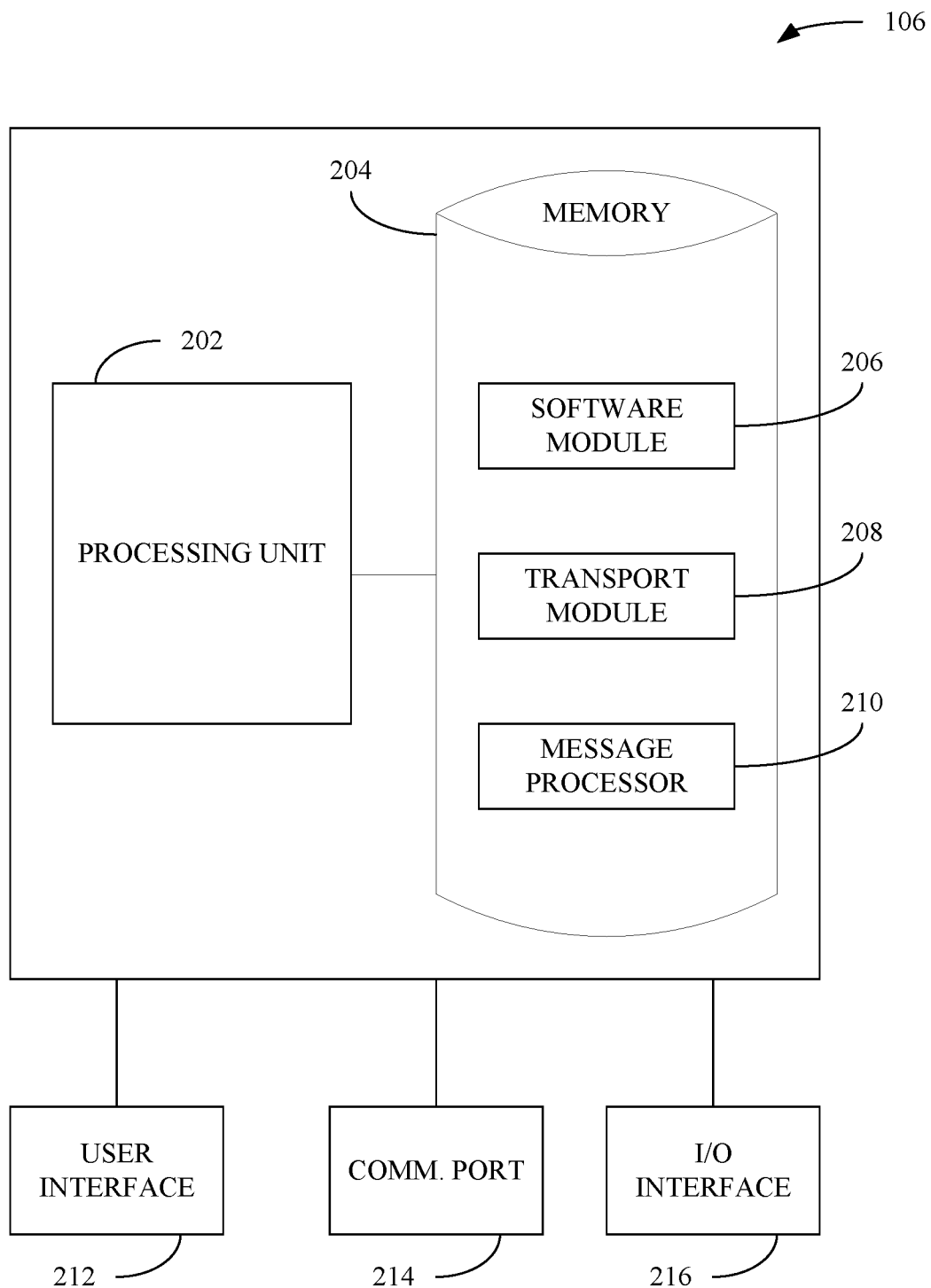
FIG. 2 shows an example schematic of a computing device consistent with this disclosure.

FIG. 2 shows an example schematic of the PMI system 106. As shown in FIG. 2, the PMI system 106 may include a processing unit 202 and a memory 204. The memory 204 may include a software module 206, a transport module 208 and a message processor 210. While executing on processing unit 202, the software module 204, the transport module 208, and the message processor 210 may perform processes for processing a transaction, including, for example, one or more stages included in a method 300 described below with respect to FIG. 3.

The PMI system 106 also may include a user interface 212. The user interface 212 can include any number of devices that allow a user to interface with The PMI system 106. Non-limiting examples of the user interface 212 include a keypad, a microphone, a speaker, a display (touchscreen or otherwise), etc.

The PMI system 106 also may include a communications port 214. The communications port 214 may allow the PMI system 106 to communicate with information systems and POS systems such as those described above with regard to FIG. 1. Non-limiting examples of the communications port 214 include, Ethernet cards (wireless or wired), Bluetooth® transmitters and receivers, near-field communications modules, etc.

The PMI system 106 also may include an input/output (I/O) device 216. I/O device 224 may allow The PMI system 106 to receive and output information. Non-limiting examples of I/O device 224 include, a camera (still or video), a printer, a scanner, etc.

The PMI system 106 may be implemented using a personal computer, a network computer, a mainframe, or any other similar microcomputer-based workstation. The PMI system 106 may be located in close proximity to the various information systems and POS systems described herein. The PMI system 106 also may be remote from the various information systems and POS systems described herein. For instance, The PMI system 106 can be a server located in close proximity to POS device 102 and the ICR 104 and remote from the epsilon system 108, the sigma system 110, and the POSCache system 112. In addition, The PMI system 106 may be a personal computer interacting with a plurality of remote servers, via network 114, running an ecommerce system and information systems.

The PMI system 106 may be modular in that transport module 208 may be completely independent from the message processor 210. For example, the transport module 208 and the message processor 210 may reside in different files. For instance, the transport module 208 and the message processor 210 may each reside in different Java JAR files. As disclosed herein, the message processor 210 may be dynamically loaded by the transport module 208 when a new client connection is made.

The transport module 208 may receive connections from the various POS device 102 and the ICR 104. In addition, the transport module 208 may load a new message processor instance when a new connection is made. During operation, the transport module also may read messages from the POS device 102 and ICR 104 and place the messages in a buffer. The buffer may be passed to the message processor 210 by the transport module. Once the message processor 210 has processed the messages and received replies from the epsilon systems 108, the sigma system 110, and the POSCache system 112, the transport module may receive a reply from the message processor and transfer the reply to the POS device 102 and the ICR 104.

The message processor 210 may connect to the epsilon system 108, the sigma system 110, and the POSCache system 112. The message processor 210 also may convert a message buffer into a message object based on a particular schema. For example, as disclosed herein, the message processor 210 may convert a message buffer into a message object based on an XML schema. The message processor 210 also may process messages by converting the XML schema into transactions and NVP using an NVP interface.

As disclosed herein, a protocol between an electronic payment system (EPS) (e.g., epsilon system 108) and POS device 102 may be a request/response protocol. Each request may contain, at a minimum, a RequestId, LocationId, and an Operation. The RequestId may be a unique numeric value that may be used to identify a request/response pair. The RequestId may be echoed back for any response message either from a server (i.e., an EPS) or a client (i.e., a POS device). As disclosed herein, many other elements may be optional or required depending on the operation specified in the Operation attribute of the message element.

Figure 3:
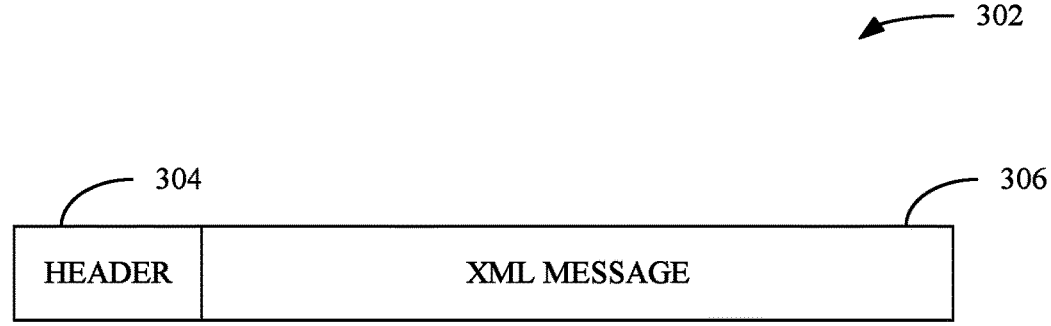
FIG. 3 shows an example request/response packet in accordance with this disclosure.

As shown in FIG. 3, a request response packet 302 may include a header 304 followed by an XML message 306. The header 304 may be a 4 byte header containing an integer value in network byte order that may specify a length of XML data to follow for the request/response packet 302. During operation, client may read the header 304 (i.e., the first 4 bytes) and convert from a network byte order to a host byte order to determine how many bytes will follow for the request/response packet 302. The XML message 306 may immediately follow the header 304 and may be UTF-8 encoded.

Unsolicited requests are possible from an EPS. These unsolicited requests are usually informational in nature such as a batch close that has completed or notifications of actions taking place on the pinpad. The POS device 102 should acknowledge any request with a response even if it is just to notify the EPS that the request was successful.

Figure 4:
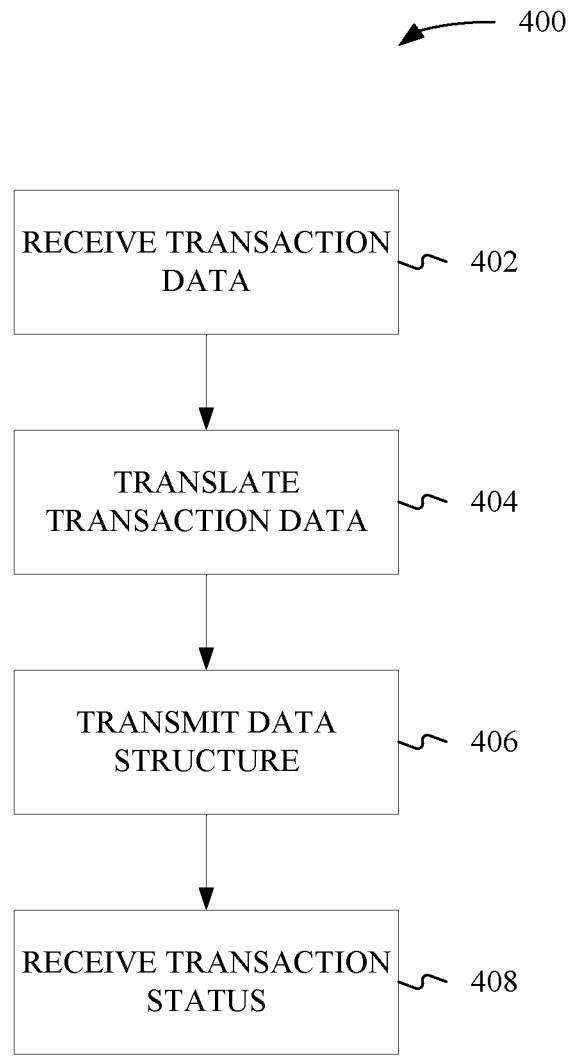
FIG. 4 shows an example method consistent with this disclosure.

FIG. 4 shows an example method 400 for processing a transaction. The method 400 may begin at stage 402, where transaction information regarding a transaction is received at the PMI system 106. As indicated above, the transaction information may be received from the POS device 102 or the ICR 104. The transaction information may include at least the request ID, location ID, and operation.

From stage 402, the method 400 may proceed to stage 404 where the transaction data may be translated into a data structure that corresponds to a payment processor. For example, as disclosed herein, the PMI system 106 may translate the transaction data into a data structure understood by the epsilon system 108, the sigma system 110, and the POSCache system 112. Thus, the PMI system 106 may also translate the transaction data into a data structure that corresponds to a loyalty processor.

In translating the transaction data the PMI system 106 may utilize the transport module 208 to transfer the message to a message buffer. The message buffer may be transferred to a message processors as described above.

Furthermore, translating the transaction data may include a XML Transform. For example, if the payment host 114 uses a fixed packet interface a mapping in code from the XML attribute in the message to the fixed packet data structure may be used. As another example, a host (e.g., loyalty host 116) may have a binary interface and thus need to include lengths of the field in binary prior to the field value. In this case, more than a mapping may be needed and the message may be constructed so as to insert the binary length followed by the field value.

From stage 404, the method 400 may proceed to stage 406, where the PMI system 106 may transmit the data structure to the payment processor and the loyalty processor. Transmitting the data structure to the payment and loyalty processors may allow the them a loyalty host, payment host, etc. so that the transaction can be approved and any loyalty rewards credited or debited from a user's account.

From stage 406, the method 400 may proceed to stage 408, where the PMI may receive a transaction status from the payment and loyalty processors. The transaction status may include an approval or denial of the transaction. For example, the customer's credit card may be declined and a denial would be returned as the status. In another example, the customer may have accumulated a given discount (e.g., $0.25 off a gallon a gas up to 20 gallons) and the transactions status may indicate this discount. In receiving the transaction status, the PMI system 106 may receive a message from the payment and loyalty programs. The PMI system 106 may add the replies to the message buffer which in turn may translate the messages from a NVP format into the XML schema used by the PMI system 106 to communicate with the POS device 102 and the ICR 104.

EXAMPLES

Example 1 is a method for processing a transaction, the method comprising: receiving, at a computing device comprising a processor, transaction information regarding the transaction; translating, by the computing device, the transaction information into a data structure that corresponds to a payment processor; and transmitting, by the computing device, the data structure to the payment processor.

In Example 2, the subject matter of Example 1 optionally includes receiving, from the payment processor, a transaction status, wherein the transaction status includes approved or denied.

In Example 3, the subject matter of any one or more of Examples 1-2 optionally include wherein translating the transaction information further includes the data structure corresponding to a loyalty processor.

In Example 4, the subject matter of Example 3 optionally includes receiving, from the loyalty processor, a transaction status, wherein the transaction status includes a discount to be applied to the transaction.

In Example 5, the subject matter of any one or more of Examples 1-4 optionally include wherein receiving the transaction information includes receiving the transaction information in a message.

In Example 6, the subject matter of Example 5 optionally includes transferring the message to a message buffer.

In Example 7, the subject matter of Example 6 optionally includes receiving, from the message buffer, a reply message.

In Example 8, the subject matter of any one or more of Examples 6-7 optionally include transferring the message buffer to a message processor.

Example 9 is a system for processing a transaction, the system comprising: a processor; and a memory storing instructions that, when executed by the processor, cause the processor to: receive transaction information regarding the transaction, translate the transaction information into a data structure that corresponds to a payment processor, and transmit the data structure to the payment processor.

In Example 10, the subject matter of Example 9 optionally includes wherein the instructions, when executed by the processor, further cause the processor to receive, from the payment processor, a transaction status, wherein the payment status includes approved or denied.

In Example 11, the subject matter of any one or more of Examples 9-10 optionally include wherein translating the transaction information further includes the data structure corresponding to a loyalty processor.

In Example 12, the subject matter of Example 11 optionally includes wherein the instructions, when executed by the processor, further cause the processor to receive, from the loyalty processor, a transaction status, wherein the transaction status includes a discount to be applied to the transaction.

In Example 13, the subject matter of any one or more of Examples 9-12 optionally include wherein receiving the transaction information includes instructions that, when executed by the processor, further cause the processor to receive the transaction information in a message.

In Example 14, the subject matter of Example 13 optionally includes wherein the instructions, when executed by the processor, further cause the processor to transfer the message to a message buffer.

In Example 15, the subject matter of Example 14 optionally includes wherein the instructions, when executed by the processor, further cause the processor to receive, from the message buffer, a reply message.

In Example 16, the subject matter of any one or more of Examples 14-15 optionally include wherein the instructions, when executed by the processor, further cause the processor to, transfer the message buffer to a message processor.

Example 17 is a non-transitory computer readable medium storing instructions that, when executed by a processor, cause the processor to: receive transaction information regarding the transaction, translate the transaction information into a data structure that corresponds to a payment processor, and transmit the data structure to the payment processor.

In Example 18, the subject matter of any one or more of Examples 15-17 optionally include wherein the instructions, when executed by the processor, further cause the processor to receive, from the payment processor, a transaction status, wherein the payment status includes approved or denied.

In Example 19, the subject matter of any one or more of Examples 17-18 optionally include wherein translating the transaction information further includes the data structure corresponding to a loyalty processor, and the instructions, when executed by the processor, further cause the processor to receive, from the loyalty processor, a transaction status, the transaction status including a discount to be applied to the transaction.

In Example 20, the subject matter of any one or more of Examples 17-19 optionally include wherein receiving the transaction information includes instructions that, when executed by the processor, further cause the processor to receive the transaction information in a message, and the instructions, when executed by the processor, further cause the processor to transfer the message to a message buffer, receive, from the message buffer, a reply message, and transfer the message buffer to a message processor.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method for processing a transaction, the method comprising:
   activating a pinpad via a StartTran command received from a payment messaging system;
   receiving, at the payment messaging system comprising a processor, transaction information regarding the transaction from a point of sale device and a card reader, the transaction information received via a single message from a single port of the point of sale device;
   translating, by the payment messaging system, the transaction information into an epsilon data structure that corresponds to an epsilon system and a sigma data structure that corresponds to a sigma system;
   transmitting, by the payment messaging system, the epsilon data structure to the epsilon system and the sigma data structure to the sigma system;
   receiving, at the payment messaging system, a pin request from the epsilon system associated with the transaction;
   transmitting, by the payment messaging system, the pin request to the pinpad;
   receiving, by the payment messaging system, a pin from the pinpad;
   transmitting, by the payment messaging system, the pin to the epsilon system; and
   deactivating the pinpad via an EndTran command received from the payment messaging system,
   wherein the pin request and the EndTran command each includes a packet, the packet including a header and an XML message, the header including a 4 byte header containing an integer value in network byte order that specifies a length of XML data contained in the XML message,
   wherein prior to transmitting the pin request to the pin pad and prior to deactivating the pinpad via the EndTran command, converting the 4 byte header from the network byte order to a host byte order and converting a signature to a UTF-8 format.

2. The method of claim 1, further comprising receiving, from the payment processor, a transaction status, wherein the transaction status includes approved or denied.

3. The method of claim 1, further comprising receiving, from the sigma system, a transaction status, wherein the transaction status includes a discount to be applied to the transaction.

4. The method of claim 1, further comprising transferring the single message to a message buffer.

5. The method of claim 4, further comprising receiving, from the message buffer, a reply message.

6. The method of claim 4, further comprising, transferring the message buffer to a message processor.

7. A system for processing a transaction, the system comprising:
   a processor; and
   a memory storing instructions that, when executed by the processor, cause the processor to:
      activate a pinpad via a StartTran command transmitted to the pinpad,
      receive transaction information regarding the transaction from a point of sale device and a card reader, the transaction information received via a single message from a single port of the point of sale device,
      translate the transaction information into an epsilon data structure that corresponds to an epsilon system and a sigma data structure that corresponds to a sigma system,
      transmit the epsilon data structure to the epsilon system and the sigma data structure to the sigma system,
      receive a pin request from the epsilon system associated with the transaction,
      transmit the pin request to the pinpad,
      receive a pin from the pinpad,
      transmit the pin to the epsilon system, and
      transmit an EndTran command to the pinpad to deactivate the pinpad,
   wherein the pin request and the EndTran command each includes a packet, the packet including a header and an XML message, the header including a 4 byte header containing an integer value in network byte order that specifies a length of XML data contained in the XML message,
   wherein prior to transmitting the pin request to the pin pad and prior to deactivating the pinpad via the EndTran command, converting the 4 byte header from the network byte order to a host byte order and converting a signature to a UTF-8 format.

8. The system of claim 7, wherein the instructions, when executed by the processor, further cause the processor to receive, from the epsilon system, a transaction status, wherein the transaction status includes approved or denied.

9. The system of claim 7, wherein the instructions, when executed by the processor, further cause the processor to receive, from the sigma system, a transaction status, wherein the transaction status includes a discount to be applied to the transaction.

10. The system of claim 7, wherein the instructions, when executed by the processor, further cause the processor to transfer the single message to a message buffer.

11. The system of claim 10, wherein the instructions, when executed by the processor, further cause the processor to receive, from the message buffer, a reply message.

12. The system of claim 10, wherein the instructions, when executed by the processor, further cause the processor to transfer the message buffer to a message processor.

13. A system for processing a transaction, the system comprising:
   a point of sale device;
   a card reader;

an epsilon system;
a sigma system;
a pinpad;
a payment messaging system in electrical communication with the point of sale device, the epsilon system, and the sigma system, the payment messaging system operable to perform actions comprising:
- activate a pinpad via a StartTran command transmitted to the pinpad,
- receiving transaction information regarding the transaction from the point of sale device and the card reader, the transaction information received via a single message from a single port of the point of sale device,
- translating the transaction information into an epsilon data structure that corresponds to the epsilon system and a sigma data structure that corresponds to the sigma system,
- transmitting the epsilon data structure to the epsilon system and the sigma data structure to the sigma system,
- receive a pin request from the epsilon system associated with the transaction,
- transmit the pin request to the pinpad,
- receive a pin from the pinpad,
- transmit the pin to the epsilon system, and
- transmit an EndTran command to the pinpad to deactivate the pinpad, wherein the pin request and the EndTran command each includes a packet, the packet including a header and an XML message, the header including a 4 byte header containing an integer value in network byte order that specifies a length of XML data contained in the XML message, wherein prior to transmitting the pin request to the pin pad and prior to deactivating the pinpad via the EndTran command, converting the 4 byte header from the network byte order to a host byte order and converting a signature to a UTF-8 format.

14. The system of claim 13, wherein a protocol between the epsilon system and the point of sale device is a request/response protocol.

* * * * *